US012456265B2

(12) United States Patent
Al-Husseini

(10) Patent No.: US 12,456,265 B2
(45) Date of Patent: Oct. 28, 2025

(54) SYSTEM AND METHOD FOR CALCULATION AND DISPLAY OF FORMATION FLIGHT INFORMATION ON AUGMENTED REALITY DISPLAY DEVICE

(71) Applicant: U.S. Army DEVCOM, Army Research Laboratory, Adelphi, MD (US)

(72) Inventor: Mahdi Al-Husseini, Douglasville, GA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 259 days.

(21) Appl. No.: 18/102,117

(22) Filed: Jan. 27, 2023

(65) Prior Publication Data

US 2024/0386673 A1 Nov. 21, 2024

Related U.S. Application Data

(60) Provisional application No. 63/303,993, filed on Jan. 28, 2022.

(51) Int. Cl.
*G06T 19/00* (2011.01)
*G01C 23/00* (2006.01)

(52) U.S. Cl.
CPC .......... *G06T 19/006* (2013.01); *G01C 23/005* (2013.01)

(58) Field of Classification Search
CPC ...... G06F 3/012; G06F 3/011; G06F 3/04815; G06F 16/444; G06F 3/0346;
(Continued)

(56) References Cited

U.S. PATENT DOCUMENTS

| 5,940,035 | A | * | 8/1999 | Hedrick | ............... | G08G 5/0095 |
|---|---|---|---|---|---|---|
| | | | | | | 342/174 |
| 6,926,233 | B1 | | 8/2005 | Corcoran, III | | |

(Continued)

OTHER PUBLICATIONS

14 C.F.R. § 91.111 "Operating near other aircraft" (Jan. 1, 2011).
(Continued)

*Primary Examiner* — Hau H Nguyen
(74) *Attorney, Agent, or Firm* — Eric B. Compton

(57) ABSTRACT

Disclosed are systems and associated methods for calculating and displaying formation flight information, to include aircraft spacing, predicted trajectory data, and lost visual contact alerts, on an augmented reality display designed to interface with aviation helmets. The augmented reality display device collects imagery of a leading aircraft from the vantage point of a pilot in a trailing aircraft. The collected imagery is processed through object detection, tracking, and orientation estimation techniques that return the leading aircraft's distance, direction, and orientation. The estimated leading aircraft data informs a generated virtual overlay. The generated virtual overlay is transmitted to the augmented reality display for viewing by the pilot in the trailing aircraft. The display of relevant formation flight information using augmented reality tools may result in improved formation flight spacing, emergency procedure response, and collision avoidance.

22 Claims, 12 Drawing Sheets

(58) Field of Classification Search
CPC ....... G06T 19/006; G06T 19/003; G06T 7/70; G09G 2380/12; G09G 5/377; G09G 2340/12; G09G 5/397; G01C 23/00; G01C 23/005
See application file for complete search history.

(56) References Cited

U.S. PATENT DOCUMENTS

| | | | |
|---|---|---|---|
| 7,024,309 | B2 | 4/2006 | Doane |
| 8,949,090 | B2 | 2/2015 | Whitehead et al. |
| 9,767,768 | B2 | 9/2017 | Venkitaram et al. |
| 9,852,547 | B2 | 12/2017 | Bostick et al. |
| 10,301,037 | B2 | 5/2019 | Frolov et al. |
| 10,656,643 | B1 | 5/2020 | Bertram et al. |
| 10,713,960 | B1* | 7/2020 | Ziarnick ............... G08G 5/0021 |
| 2008/0195309 | A1* | 8/2008 | Prinzel, III ........... G08G 5/0021 701/532 |
| 2015/0168728 | A1 | 6/2015 | Kobayashi |
| 2019/0304103 | A1* | 10/2019 | Onomura ................. G06T 7/60 |
| 2022/0051585 | A1 | 2/2022 | Robinson et al. |
| 2022/0063795 | A1* | 3/2022 | Walter ................... B64C 13/12 |

OTHER PUBLICATIONS

Army Training Publication No. 3-04.1 "Aviation Tactical Employment," Apr. 2016.

A. Hiliuta, R. Landry and F. Gagnon, "Fuzzy corrections in a GPS/INS hybrid navigation system," in IEEE Transactions on Aerospace and Electronic Systems, vol. 40, No. 2, pp. 591-600, Apr. 2004.

Ananth Ranganathan, "The Oculus Insight positional tracking system," AI Accelerator Institute, Jun. 27, 2022, available at: https://www.aiacceleratorinstitute.com/the-oculus-insight-positional-tracking-system-2/.

Johannes Rieke, "Object detection with neural networks—a simple tutorial using keras," Towards Data Science, 2017, available online at: https://towardsdatascience.com/object-detection-with-neural networks-a4e2c46b4491.

Cindy Trinh Sridykhan, "A tour of Video Object Tracking—Part I: Presentation," Medium, 2019, available online at: https://medium.com/@cindy.trinh.sridykhan/a-tour-of-video-object-tracking-part-i-presentation-8a8aa9da9394.

Cindy Trinh Sridykhan, "A tour of Video Object Tracking—Part II: Single Object Tracking," Medium, 2019, available online at: https://medium.com/@cindy.trinh.sridykhan/a-tour-of-video-object-tracking-part-ii-single-object-tracking-708261304ea7.

Cindy Trinh Sridykhan, "A tour of Video Object Tracking—Part III: Multiple Object Tracking," Medium, 2019, available online at: https://medium.com/@cindy.trinh.sridykhan/a-tour-of-video-object-tracking-part-iii-multiple-object-tracking-5e3a15ae0a7c.

Gaudenz Boesch, "Object Detection in 2023: The Definitive Guide, 2023," viso.ai, available online at: https://viso.ai/deep-learning/object-detection/.

U.S. Appl. No. 18/097,669, filed Jan. 17, 2023.

Notice of Allowance having a mail date of Aug. 8, 2024 in U.S. Appl. No. 18/097,669.

* cited by examiner

SYSTEM AND METHOD FOR CALCULATION AND DISPLAY OF FORMATION FLIGHT INFORMATION ON AUGMENTED REALITY DISPLAY DEVICE

CROSS REFERENCE TO RELATED APPLICATION(S)

This application claims the benefit of U.S. Provisional Patent Application No. 63/303,993 filed Jan. 28, 2022, which is herein incorporated by reference in its entirety for all purposes.

GOVERNMENT INTEREST

The invention described herein may be manufactured, used, and licensed by or for the United States Government.

BACKGROUND

1. Technical Field

The present invention pertains to formation flight navigation, and more particularly to the calculation and display of predicted path data, collision avoidance alerts, and chalk-specific information on an augmented reality device using optical equipment and machine learning techniques for object detection and orientation estimation.

2. Background Art

The following is a tabulation of some prior art that presently appears relevant (and are herein incorporated by reference in their entirety):

U.S. Patents

| Patent Number | Kind Code | Issue Date | Patentee |
| --- | --- | --- | --- |
| 8,949,090 | B2 | Feb. 3, 2015 | Whitehead et al. |
| 9,852,547 | B2 | Dec. 26, 2017 | Bostick et al. |
| 10,301,037 | B2 | May 28, 2019 | Frolov et al. |

3. Background

The Federal Aviation Administration defines formation flight in 14 C.F.R. § 91.111 as operating near other aircraft, along with a series of operational requirements regarding collision hazards and passengers for hire. Generally, formation flight consists of two or more aircraft ordered by serial and chalk, with a clear and well-defined delineation of in-air responsibilities, and a shared objective. Safe formation flight requires a thorough understanding of route structures, aircraft aerodynamics, procedures relating to lost visual contact and lost communication, in-flight link-up procedures, lead change procedures, emergency procedures, and more.

Timely, tight, and precise formation flight is an essential task for several military missions which collectively engage a wide range of rotary-wing and fixed-wing aircraft. The United States Army Aviation enterprise especially prides itself on its Air Assault mission-set, typically involving some combination of UH-60 Black Hawk and CH-47 Chinook helicopters. Air Assault is the strategic movement of Soldiers, typically light infantry, into and across the battlefield to seize and maintain critical territory. Air Assault further encompasses several unique capabilities to include fast-roping, rappelling, and special patrol insertion and extraction. The $101^{st}$ Airborne Division is the United States Army's light infantry division specializing in Air Assault operations, and Air Assault training is conducted at several specialized Air Assault schools across the United States.

Formation flight, although a force multiplier on the battlefield, is inherently risky. There are a multitude of well-documented case studies detailing fatal formation flight accidents on the civilian and military side alike, the vast majority being mid-air collisions between formation aircraft caused by either failing to properly execute emergency procedures or failing to maintain situational awareness of nearby aircraft.

Augmented reality displays provide situationally relevant information in real-time in both visually degraded environments (such as during nighttime operations) and environmentally hazardous environments (such as during formation flight). Army Aviators already train and maintain proficiency on military heads-up displays during nighttime operations; these systems are designed to integrate with existing night vision devices.

SUMMARY

Described are intelligent augmented reality systems and associated methods, featuring optical equipment and machine learning techniques for object detection and orientation estimation. The invention provides relevant information, and thereby increased situational awareness, to pilots engaged in formation flight, to ensure enhanced flight operations.

Herein, are disclosed various embodiment for systems and associated methods for calculating and displaying formation flight information, to include aircraft spacing, predicted trajectory data, and lost visual contact alerts, on an augmented reality display designed to interface with aviation helmets. The augmented reality display device collects imagery of a leading aircraft from the vantage point of a pilot in a trailing aircraft. The collected imagery is processed through object detection, tracking, and orientation estimation techniques that return the leading aircraft's distance, direction, and orientation. The estimated leading aircraft data informs a generated virtual overlay. The generated virtual overlay is transmitted to the augmented reality display for viewing by the pilot in the trailing aircraft. The display of relevant formation flight information using augmented reality tools may result in improved formation flight spacing, emergency procedure response, and collision avoidance.

These and other embodiments of the invention are described in more detail below.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
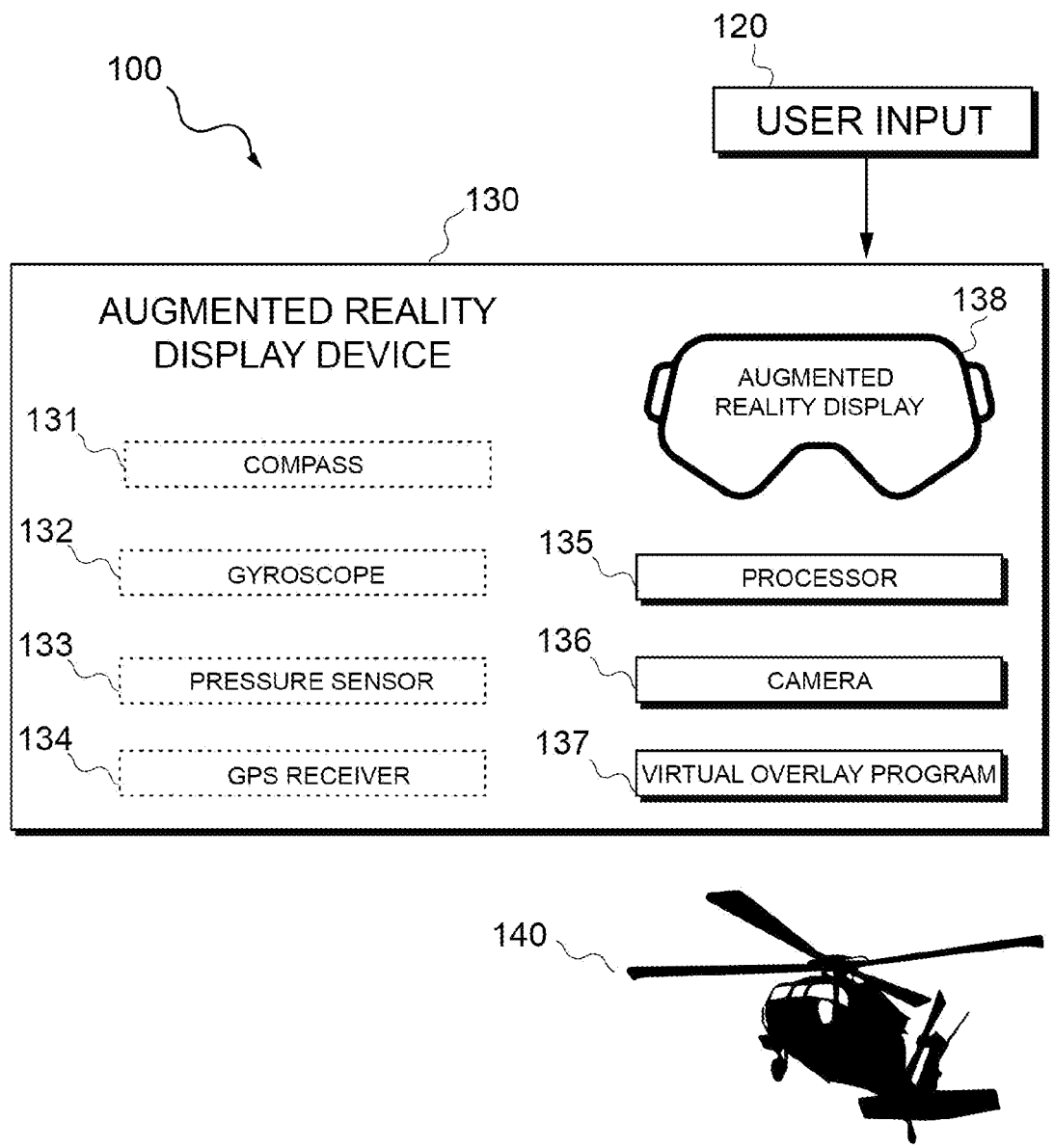
FIG. 1 depicts an example of the subcomponents of an augmented reality display device for an individual aircraft during formation flight, in accordance with an embodiment of the present invention.

The concise, intelligent, and organized presentation of aircraft data through heads-up displays and similar augmented reality applications has resulted in improved safety outcomes and enhanced overall performance. The present invention takes advantage of advances in machine learning architectures and models, especially those relating to real-time object detection and orientation estimation, to provide pilots critical information regarding not only their own aircraft, but aircraft in their immediate vicinity; some embodiments of the present invention may extend this application to not only the discussed dangers of formation flying, but single-ship general aviation procedures as well. Embodiments of the present invention discussed in the detailed description and shown in the drawings are not intended to restrict the scope of aircraft augmented reality applications, but rather, to illuminate the underpinnings and advantages brought about through variations on the proposed invention. Additional embodiments may be possible.

The figures will now be discussed in-depth to describe the present invention. FIG. 1 depicts an example of the subcomponents of an augmented reality display device 130 for an individual aircraft 140 during formation flight, generally designated 100, in accordance with an embodiment of the present invention. Augmented reality display device 130 includes and/or is operatively connected to a processor 135, a camera 136, an augmented reality display 138, and virtual overlay program 137, and may further include a compass 131, a gyroscope 132, a pressure sensor 133, and a GPS receiver 134. Augmented reality display device 130 is informed by user input 120. In aircraft with a dual-pilot cockpit, more than one augmented reality display device 130 may be present, along with a means or mechanism for indicating which pilot is actively on the controls, to prevent improper triggering of lost visual contact alerts.

Data and information may be transmitted and exchanged between hardware elements via at least one network via known network communication protocols. For instance, the network may be any type of wireless network, to include, for example, a wireless local area network (WLAN), wireless personal area network (WPAN), wireless metropolitan area network (WMAN), wireless wide area network (WWAN), satellite-based networks, or any combination thereof. The device 130 may include one or more antennas and other requisite hardware and processors for radio communications.

The augmented reality display device 130 is being represented as the overall system for the aircraft. Some of elements, such as compass 131, gyroscope 132, pressure sensor 133 and GPS receiver 134, may already exist elsewhere on the aircraft and may provide input for the augmented reality device 130. In other words, such elements need only to be operatively connected to the augmented reality device 130. Although, in other embodiments, such elements may be incorporated into or otherwise a part of the augmented reality device 130 itself.

Compass 131 and gyroscope 132 may be packaged separately, or on a consolidated inertial measurement unit (IMU) chip. These hardware arrangements are standard to aviation industry practice are will not be further described herein.

Pressure sensor 133 may include, for example, one or more, or any combination of digital pressure, analogue barometric pressure, and differential pressure sensors, to determine aircraft altitude. GPS data is used for determining and tracking the position of each aircraft. GPS receiver 134 may include one or more global positioning system receivers that provides accurate location data calculated from delays in signal propagation from four or more GPS satellites. As received, GPS data describes a device's location and generally includes terms of longitude, latitude, altitude, and the time that the transmission was received. Alternatively, aircraft altitude and location may be sourced to augmented reality display device 130 through any one of several existing internal or external aircraft systems designed to aggregate aircraft information. The use of known aviation-proximity sensors, such as RADAR, LIDAR, ultrasonic, or otherwise, can be included in or on the aircraft. Such sensors are common for most aircraft. They can be used to provide distance measurements between aircrafts as well as other objects. These measurements, in turn, can be used to estimate aircraft relative position in a formation. For instance, the system can be operatively configured to interact with the aviation-proximity sensors to measure and track distances between the aircrafts in formation.

Altitude measurements can be determined using the aircraft's altimeter. Altimeters traditionally use barometric pressure sensors for measuring ambient pressure outside the aircraft. Alternatively, GPS data which includes altitude information can be used.

Gyroscope 132 measures the orientation and angular velocity of the pilot's head thus providing the pilot's orientation. The compass 131 determines the direction of the pilot's head thus providing the heading. The orientation data from the gyroscope 132 when paired with heading data from compass 131, may be used to map the pilot's overall operational view.

Virtual overlay program 137, run on processor 135, generates a unique virtual overlay informed by both user input 120 and the multitude of sensors on augmented reality display device 130. It is generated by the processor 135. Processor 135 may comprise one or more suitable computer processors executing computer-implementable instructions (software) according to the algorithms and methodologies disclosed herein. User input 120 may be accessed, filled-out, and submitted through an application on a mobile device or other platform, and is intended to be completed prior to the formation flight in accordance with the mission or objective.

Augmented reality display 138 is a wearable heads-up display through which the pilot is presented critical formation flight information during flight. Augmented reality display 138 may be worn alone in the form of a headset, goggles, or glasses, or may be integrated into an existing aviation helmet design, as shown in 200. The mapping of the pilot's view is important to properly correlate the display of virtual view-dependent information with the pilot's view. This mapping, paired with object tracking algorithms such as particle filters and online or offline convolutional neural networks, allows for the initial estimation and tracking of the approximate location of a second aircraft in the pilot's view. Positional tracking algorithms are common and important for many headset displays, and include, for example, the well-known Oculus Rift. A discussion on a positional tracking algorithm for a heads-up display is provided in the following article: Ananth Ranganathan, "The Oculus Insight positional tracking system," AI Accelerator Institute, 27 Jun. 2022, available at: https://www.aiacceleratorinstitute.com/the-oculus-insight-positional-tracking-system-2/ (and, in particular, see the subsection titled "Building a map and localizing"), herein incorporated by reference in its entirety. Essentially, an IMU helps predict movement between frames, and thus locations on the global map. Use of a second camera (stereo vision) can also greatly enhance global map accuracy. This algorithms and other positional tracking algorithms and models can be used in one or more embodiments to map the pilot's overall operational view on the display of the on the augmented reality display 138. By developing a map that extends 180 degrees or more around the pilot, the approximate location of a second aircraft can be tracked even when not in the immediate view of the pilot. If we assume the origin exists when the pilot is facing immediately forwards, the map can reasonably be expected to extend, at the least, about 100 degrees in yaw in either direction, such that visibility of other aircraft through side windows are included. However, if the aircraft forward of our aircraft is at the 90-degree point from the origin of said map, that would suggest the two aircraft are actually abeam one another (parallel)-anything further would be a change in formation configuration (and thus a change in leading/trailing aircraft). The same technique can be used in the pitch direction too. The views can be easily scaled to the display unit. For instance, for aircrafts and object close to the pilot, virtual information can be depicted/displayed nearly to the center of the display whereas those farther away can be depicted/displayed at the edges or periphery of the display. In that way, the virtual displayed information approximates the virtual viewpoint of the wearer. The estimated relative positioning of a second aircraft may be used to inform the relative placement of key information on augmented reality display 138, as well as change the information itself, in the case of directionality vector 530 during a lost visual contact alert.

Camera 136 may be one or more outward facing cameras strategically positioned to capture the perspective of the pilot for the purposes of improved second aircraft detection and tracking. Camera 136 can be any camera or imaging system. Collected imagery can be still images or streaming imagery over time (like video). Ideally, it is a high-definition video camera for providing adequate views. Camera 136 need not necessarily operate in, or only in, the visual light spectrum, and may further allow for infrared thermography, to include short wavelength infrared (SWIR), medium wavelength infrared (MWIR), and long wavelength infrared (LWIR). Accessing the infrared spectrum is especially valuable during nighttime formation flights, where infrared imaging may prove sufficient for object detection and orientation estimation, to allow continued use of the proposed invention throughout multiple mission profiles. Camera 136 may also integrate night vision light intensification, which amplifies existing visible light. In other embodiments, various other imaging system can be used for added image capture capabilities which can provide other mission benefits. For instance, a second camera (preferably, configured to provide stereo vision) can be included to greatly enhances visional depth. Additional cameras might also be provided to increase the field of view in some instances.

The cameras 136 preferably collect imagery from the vantage point of a pilot in the aircraft for the purposes of improved second aircraft detection and tracking. In some embodiments, a forward-facing camera is provided. The forward-facing camera in trailing aircraft(s) thus can provide a "view" of leading aircraft(s). Alternatively or additionally, in embodiments, a backward-facing camera is provided. The backward-facing camera in leading aircraft(s) thus can provide a "view" of trailing aircraft(s). Taken together, the various views can be input to the system and made available to the pilots given them better situational awareness.

Figure 2:
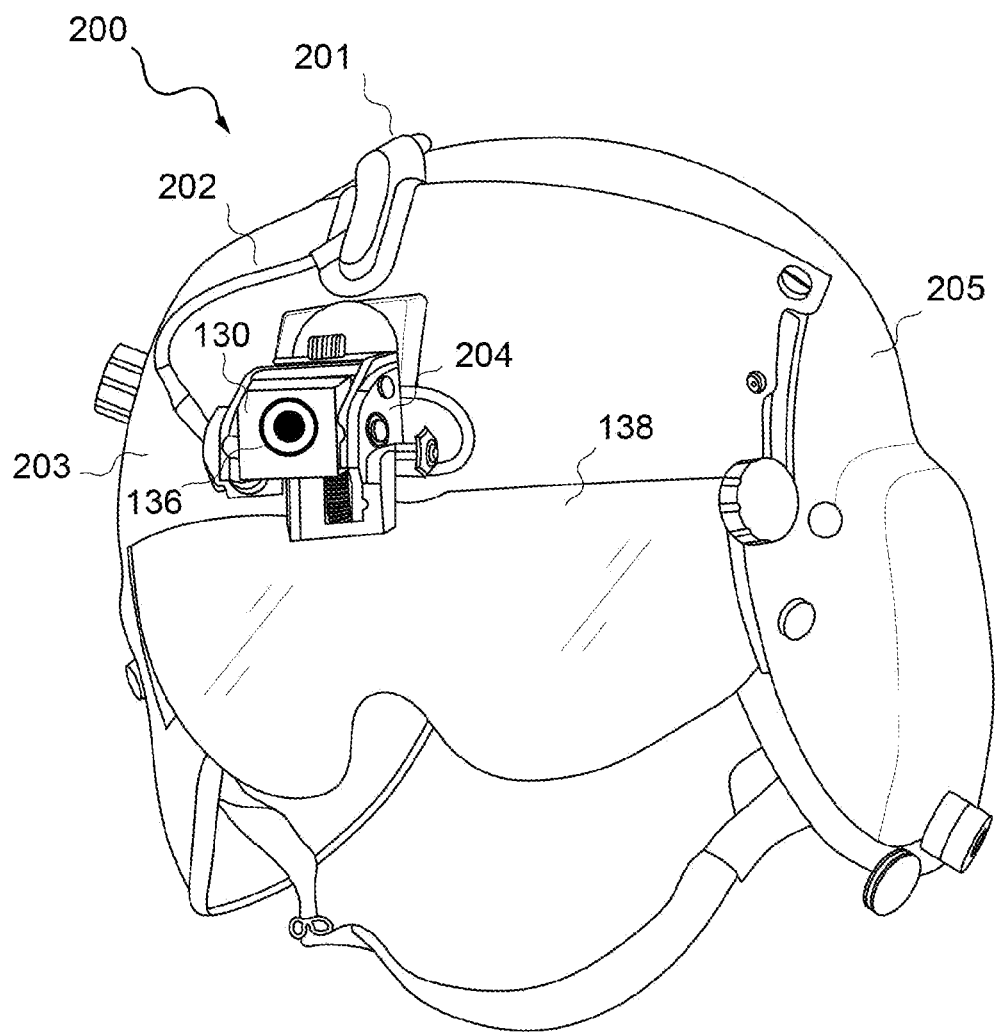
FIG. 2 depicts an example of the augmented reality display device display as integrated into an existing aviation helmet design.

FIG. 2 depicts an example of the augmented reality display device display as integrated into to an existing aviation helmet design and is generally designated as 200. In embodiments, the system may make use of existing or modified aviation helmets. For instance, HGU-56P is the standard Army aviation helmet, and the helmet displayed here and modified for the invention. Augmented reality display device 130 may be attached to the mounting assembly 204, commonly used for the attachment of night vision devices. Mounting assembly 204 contains internal electrical leads that allow for the transfer of power to the attached device; this power is commonly transferred through power transfer cord 202 to the battery pack port 201. Augmented reality display device 132 may be strategically placed on any location on helmet shell 205 or visor assembly 203—however, regulatory helmet mass and moment requirements must be considered. In some implementations, a strap can be provided with the display 210 for securely coupling it to the wearer's head; it may be elastic and/or provided with adjustable attachment means, like Velcro® material or a buckle.

Augmented reality display 138 is here visualized as a visor that seamlessly integrates with visor assembly 203. In embodiments, the display 138 may include a liquid crystal display (LCD), light emitting diode (LED) display or organic LED (LED) display, as non-limiting examples, operatively connected to the augmented reality device 130 which generates and provides digital content data (e.g., video, image, sound, etc.). Camera 136 is affixed in a manner that allows for the near mirroring of the pilot's field of view.

Figure 3:
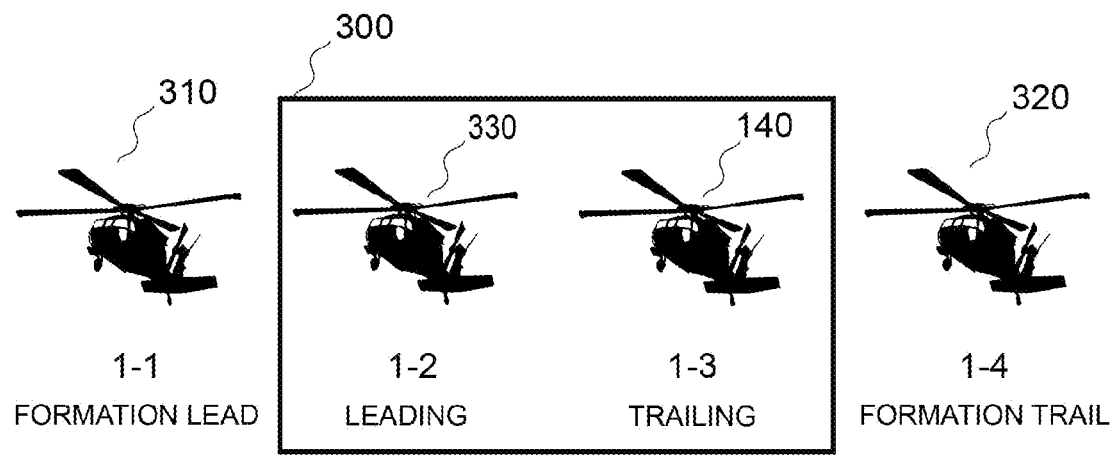
FIG. 3 depicts an example of formation flight along with associated naming conventions for key aircraft, in accordance with an embodiment of the present invention.

FIG. 3 depicts an example of formation flight along with associated naming conventions for key chalk aircraft, in accordance with an embodiment of the present invention. Innumerable flight formation configurations exist, and although a linear flight configuration is here shown, it is to be understood that the present invention is not limited to the depicted configurations. Formation flight must involve at least two aircraft, and if not simply leading and trailing in arrangement—such as if in a parallel or V configuration—the formation aircraft may instead be labeled numerically, e.g., a first, second, third aircraft and so on.

The terms "chalk," "serial" and "lift" as used herein are military aviation terms which describe aircraft in flight formations. They are discussed in Army Training Publication No. 3-04.1 "Aviation Tactical Employment," dated April 2016, (and, in particular, see Chapter 5, Section, V, p. 5-23), herein incorporated by reference in its entirety. In general, a "chalk" refers to a single aircraft comprised of the load contained within. A "serial" is a group of chalks. So, in a serial, different aircraft can be designated as chalk 1, chalk 2, chalk 3, so on and so forth, as an example. A "lift" is comprised of one or more serials having a serial designation like serial 1, serial 2, serial 2, and so on, as an example. All chalks should be designated within serials and lifts. Thus, an exemplary chalk designation of 1-2 refers to the serial 1, chalk 2.

Aircraft coupling 300 depicts two aircraft, which may be leading 140 and trailing 150 in nature, or otherwise simply denoted as first and second. Typically, a formation lead aircraft 310 and formation trail aircraft 320 is designated, as these strategic positions play critical roles during both regular flight operations and emergency procedure response. Formation lead aircraft 310 and formation trail aircraft 320 may therefore feature key differences in their associated augmented reality overlays compared to aircraft located in the mid-section of the formation.

Figure 4:
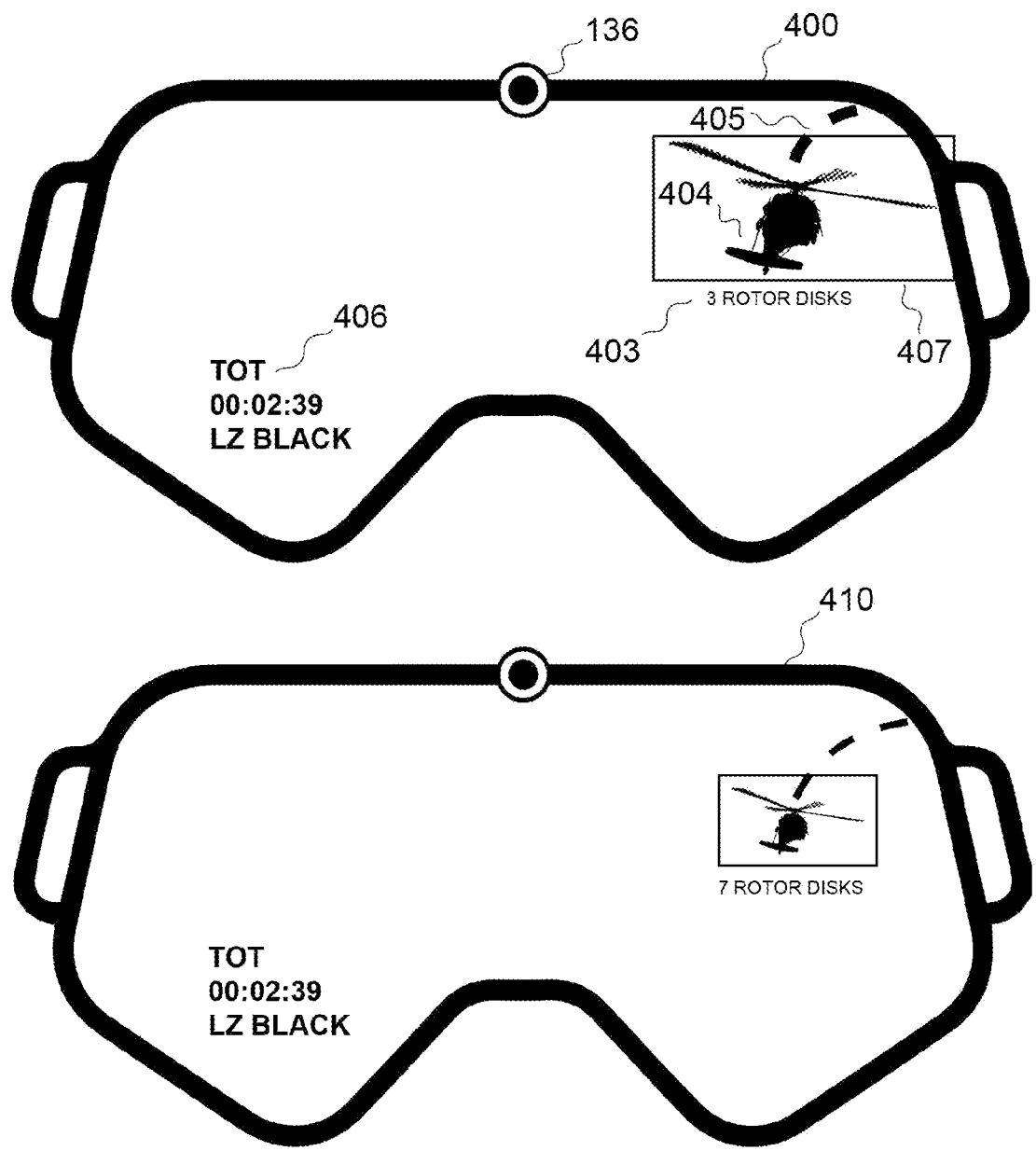
FIG. 4 depicts an example of an augmented reality virtual overlay for a trailing aircraft, with the leading aircraft at different distances, in accordance with an embodiment of the present invention.

FIG. 4 depicts an example of an augmented reality virtual overlay in a trailing aircraft (such as the 1-3 trailing aircraft 140 depicted in FIG. 3), with the leading aircraft 404 (such as the 1-2 leading aircraft 330 in FIG. 3) virtually displayed on an augmented reality display embodied as goggles, at different distances, in accordance with an embodiment of the present invention. As shown, the aircraft 404 may be depicted as a simple icon/symbol thereof on the augmented reality display. The goggles would be worn be a pilot or co-pilot of the trailing aircraft. In the first trailing display 400, the leading aircraft 404 is estimated to be approximately three rotor disks away. In the second trailing display 410, the leading aircraft 404 is estimated to be approximately seven rotor disks away. Aircraft bounding box 407 need not be included in the generated overlay for augmented reality display 138 but may be used to appropriately position overlay features. For example, distance estimation metric 403 may be positioned immediately outside of aircraft bounding box 407, to ensure it does not disrupt the pilot's view of leading aircraft 404. For briefing purposes, helicopter separation is often operationally defined by units of rotor disks, as opposed to meters or feet; tight spacing is one to two disks of separation, close spacing is three to five disks of separation, loose spacing is six to ten disks of separation, and extended spacing is greater than ten rotor disks. The conversion from traditional units of distance to operational units is yet another function of processor 135. Notably, formation aircraft may not be rotary wing in nature, and may therefore use different units of measure. This information may be input in or captured via user input 120. It is further noted that any aircraft other than the leading aircraft could wear display 410 (as they are technically trailing, some aircraft).

The processor 135 can take distance estimate values and divide by a user-input spacing variable for a given aircraft to compute the operational unit for distance, like rotor disks. As shown in trailing displays 400 and 410 and previously discussed, the accurate estimation of leading aircraft 404 position in the trailing pilot's view allows for the dynamic placement of relevant information, such as distance estimation metric 403 and estimated trajectory 405, around that position, so as not to interfere with the pilot's view of the leading aircraft. Although heads-up displays are characterized by the transparent (see-through) nature of their text and/or symbology, interfering in any manner with the pilot's view of an aircraft in proximity may prove dangerous. Further, for estimated trajectory 405 to be meaningful and correct, the trajectory must be instantiated at the leading aircraft's current position. Estimated trajectory 405 may be visualized differently depending on the separation distance of the leading aircraft and the presumed accuracy of the trajectory itself; for example, the trajectory path may be thicker if the leading aircraft is closer, and thinner if the leading aircraft is farther away.

Additional information of value that may be denoted on the overlay includes time on target details 406. Time on target (TOT) is a military aviation term. It refers to the time remaining in flight to a defined geographic coordinate (end point), typically where some mission-driven requirement is to occur, as part of the flight plan. Time on target details 406 may include the name of the upcoming waypoint, as well as time to and/or distance from the upcoming waypoint and destination. It can be computed by taking the difference in end position and current position (distance), and by knowing the current aircraft velocity (rate) and flight path, converted to a time (time). A simple conversion for an aircraft flying at constant velocity in a straight line to the target is time=distance/rate. Although, more sophisticated flight duration estimation algorithms exist and could be used. Time on target details 406 may all be defined in user input 110 as part of an initial mission briefing. In the figures, TOT is indicated at 2 minutes and 39 seconds. The inclusion of time on target details 406 requires the integration of GPS receiver 134 into augmented reality display device 130, so that aircraft position may be determined, and aircraft ground speed may be calculated. Other information can be further depicted. Examples may include situation or weather information. In the figures, "LZ BLACK" refers to the present condition at the target, that is, the landing zone is dark.

Figure 5:
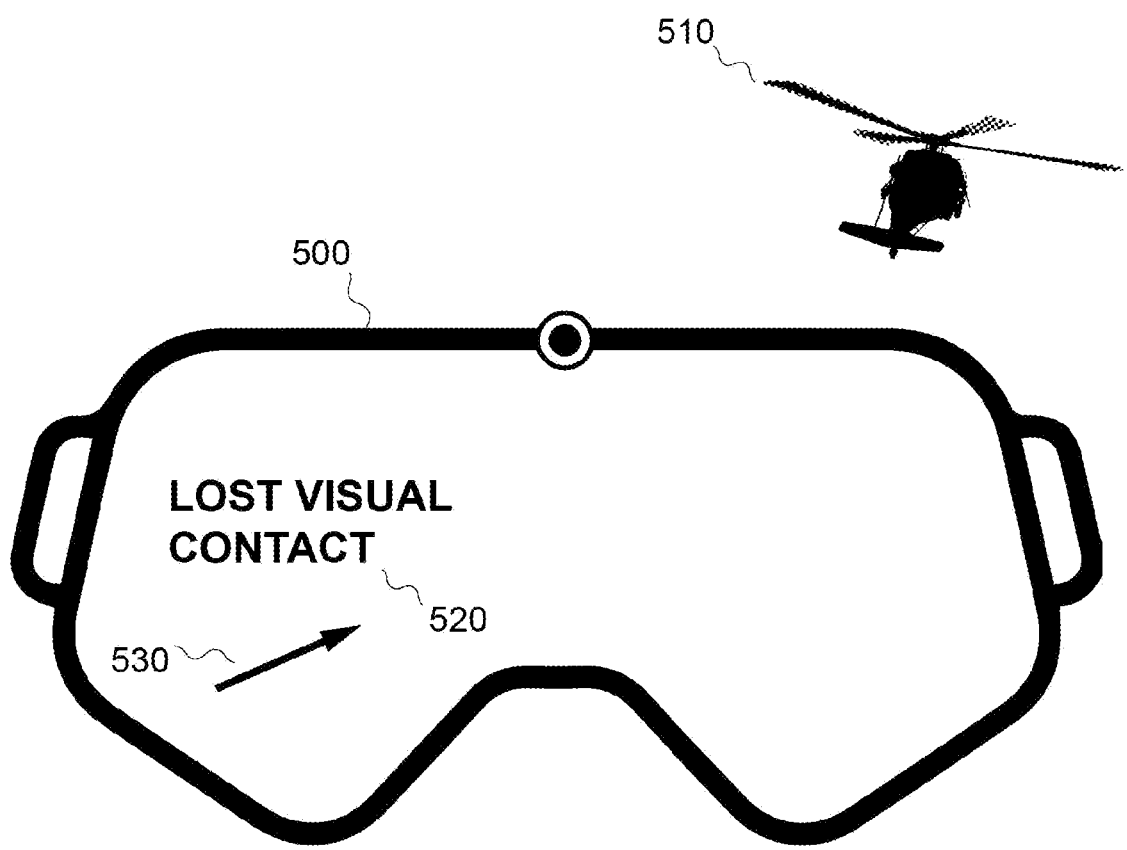
FIG. 5 depicts an example of an augmented reality virtual overlay for a trailing aircraft, with an issued lost visual contact alert and associated directionality vector, in accordance with an embodiment of the present invention.

FIG. 5 depicts an example of an augmented reality virtual overlay for a trailing aircraft, with an issued lost visual contact alert 520 and associated directionality vector 530, in accordance with an embodiment of the present invention. The risk of mid-air collisions increases significantly during formation flight, and these collisions are often fatal. The risk of mid-air collisions further increases when situational awareness is degraded, and more specifically, when nearby aircraft, in the same formation or not, are no longer in sight. In the case of a lost visual contact alert, overlay 500 is stripped of all but the most critical information—namely, a prominently featured collision avoidance text alert 520 and associated directionality vector 530. As an example, the collision avoidance text alert 520 may state: "LOST VISUAL CONTACT." Although, other text and/or indicia (including sounds) can certainly be provided. Directionality vector 530 indicates the relative location and bearing of the tracked aircraft 510, no longer in the pilot's field of view, to help the pilot regain visual contact with said aircraft, or at least to improve general situational awareness. The pilot may adjust which and how information is displayed in all instances to include lost visual contact alerts, in user input 120.

Figure 6:
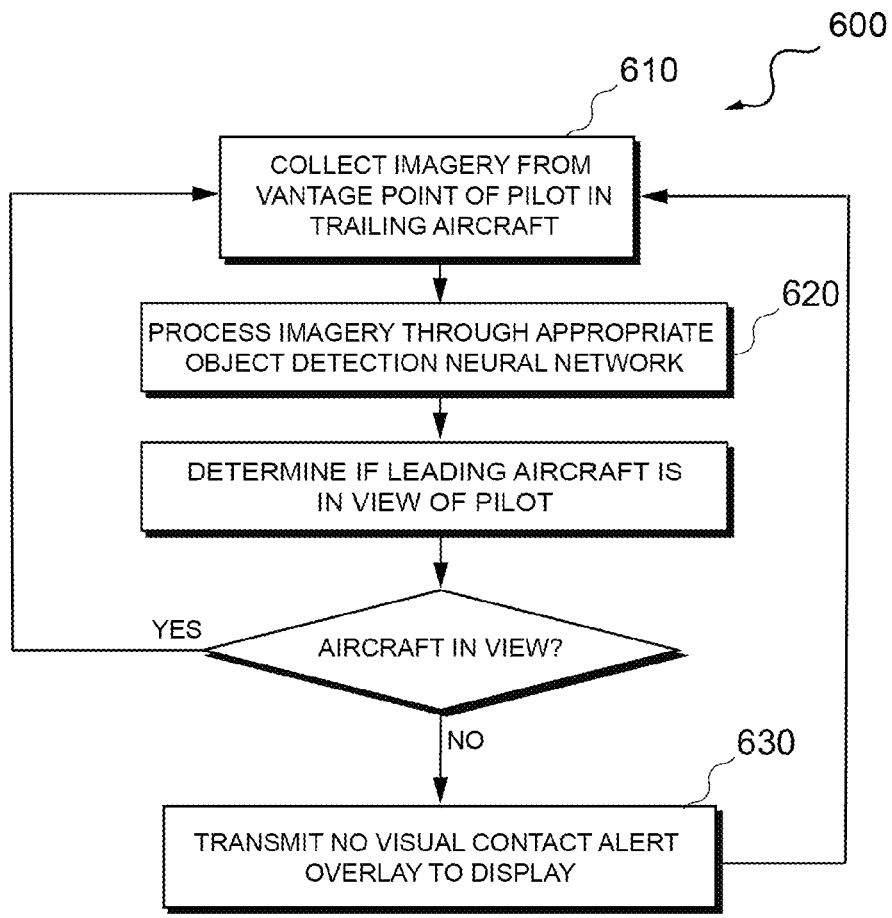
FIG. 6 depicts a flowchart of a computer-implemented algorithm illustrating one example of how a lost visual contact alert may be determined and displayed, in accordance with an embodiment of the present invention.

FIG. 6. depicts a flowchart of a computer-implemented algorithm, generally designated as 600, illustrating one example of how a lost visual contact alert may be determined and displayed, in accordance with an embodiment of the present invention. In 610, imagery is collected from the pilot's vantage point using camera 136 and processed through one or more object detection neural network models 620 to determine an orientation estimation. Preferably, this occurs in real-time.

Various known object detection and tracking techniques can be employed according to embodiments. For instance, see Gaudenz Boesch, "Object Detection in 2023: The Definitive Guide, 2023 viso.ai, available online at: https://viso.ai/deep-learning/object-detection/, herein incorporated by reference in its entirety. They can be adapted for aircrafts as objects. Additionally, known techniques for detecting and tracking of moving aircrafts may be employed. Video data from camera can be used for this purpose too. The following is a good primer: Cindy Trinh Sridykhan, "A tour of Video Object Tracking—Part I: Presentation," Medium, 2019, available online at: https://medium.com/@cindy.trinh.sridykban/a-tour-of-video-object-tracking-part-i-presentation-8a8aa9da9394, herein incorporated by reference in its entirety.

Moreover, self-learning techniques can be further applied for greater and continually improving detection accuracy. These can include neural networks. For instance, see Johannes Rieke, "Object detection with neural networks—a simple tutorial using keras," Towards Data Science, 2017, available online at: https://towardsdatascence.com/object-detection-with-neural-networks-a4e2c46b4491, herein incorporated by reference in its entirety. Indeed, there are a variety of existing neural network architectures (e.g., Yolo, R-CNN, or mobilenet) that may be used for embodiments of the present invention. Regardless of the particular architecture, the selected model enables it to "learn" to recognize aircraft using a customized data-set specific to embodiments of the invention. To these ends, reference images for known aircrafts (like helicopters and airplanes) may be provided for their detection and learning. And more particularly, reference images of particular aircrafts, like for UH-60 Black Hawk and CH-47 Chinook helicopters can be used to distinguish between helicopters. With image tagging (such as in file metadata), the reference images can be linked to user-selection. For instance, a pilot-selected UH-60 Black Hawk helicopter may call up only reference images for that aircraft. Since the front, rear and side views of these aircrafts differ, reference images thereof at different viewpoints may be provided. The reference images may be further tagged by camera view/angle for quickly searching different camera views. For instance, rear aircraft views would be used by forward-facing cameras and front aircraft views would be used for backward-facing cameras. Side views can be further used by both. The images can be oriented in various directions, such as pitch, yaw and roll, to assist in estimation the position of the aircraft. A suit of digital images of different aircrafts can be provided in this manner.

Next, a decision is made whether the leading aircraft is in view of the trailing aircraft pilot. If the leading aircraft is detected, and in the estimated view of the pilot, no lost visual contact alert is displayed, and monitoring continues. But if the leading aircraft is not detected, a lost visual contact alert is displayed or otherwise made in 630. Additional provisions may be included for completeness and robustness. For example, during a formation lead change, the immediately trailing aircraft usually becomes the lead, and the former lead aircraft is removed from sight, as they transition to the rear of the formation. The pilot of the new lead aircraft may indicate to augmented reality display device 130 that a formation lead change has occurred through user input 120. The same is true of lost communication emergency procedures and planned formation break-up in-flight.

Figure 7:
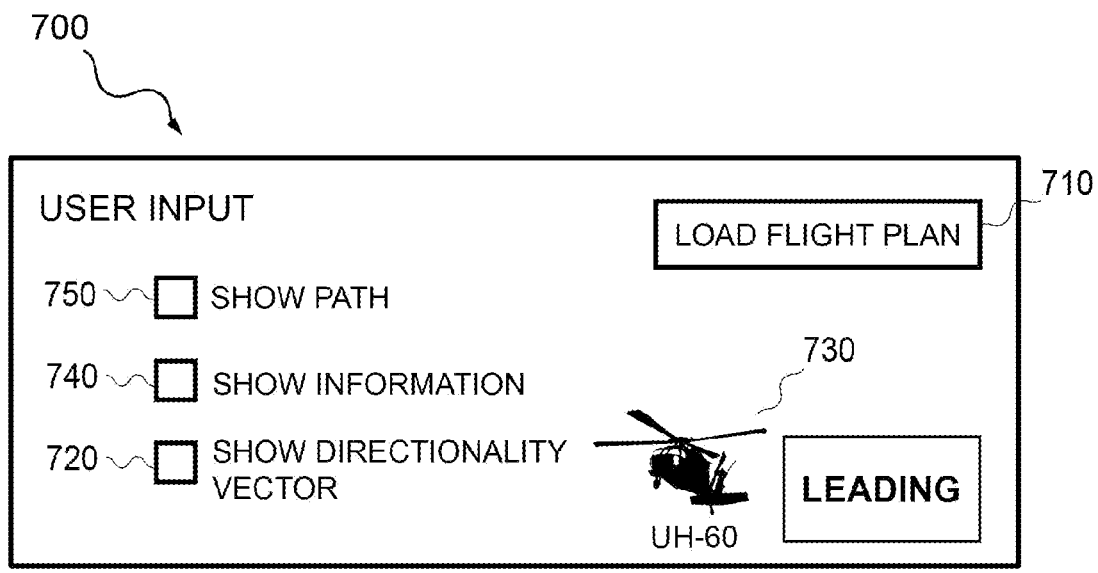
FIG. 7 depicts an example of a computer-generated user input form to be filled by a pilot prior to flight, that defines the display of information on the augmented reality display device, in accordance with an embodiment of the present invention.

FIG. 7 depicts an example of a computer-generated user input 120, in a digital and editable submission form, generally designated as 700, to be filled by a pilot prior to flight, that defines the display of information on the augmented reality display device, in accordance with an embodiment of the present invention. The user input form 700 may be generated by the processor 135. Editable submission form 700 may include one or more formation flight information selection options 740, one or more leading aircraft predicted path selection options 750, and one or more directionality vector selection options 720; these selection options allow the user to customize or personalize generated overlays in a mission-specific manner. A mechanism for loading the intended flight plan 710 allows for the display of time on target details 406. The aircraft type of leading aircraft 730 should be identified to ensure the appropriate object detection model is used; this selection may be altered in-flight in the case of in-flight formation changes. Here, the pilot-designated leading aircraft 730 is a UH-60 Black Hawk helicopter. Various aircraft types may be provided (such as in a dropdown box or list) for selection.

The flight plan can be uploaded by a pilot ahead of flight which provides the flight path. Such data may include mapping information setting forth the flight path. Precise data, like GPS, can be include in the loaded flight plan 710 and used for this purpose. The flight plan may be executed by the aircraft, such as by hybrid navigation. Hybrid navigation is today pretty-standard implementation in most advanced systems (aircraft, self-driving cars, etc.). The hybrid navigation model tracks the aircraft's position in real time and compares it to the flight path. The system responds to maintain the aircraft on the desired flight path by making correction to the flight controls. Hybrid navigational models may use neural networks or so-called fuzzy logic correction algorithms for more precise controls. One exemplary hybrid navigation system is described in the following paper: A. Hiliuta, R. Landry and F. Gagnon, "Fuzzy corrections in a GPS/INS hybrid navigation system," in IEEE Transactions on Aerospace and Electronic Systems, vol. 40, no. 2, pp. 591-600, April 2004, herein incorporated by reference in its entirety. This and other hybrid navigation models can be used in one or more embodiments to determine aircraft location and predict aircraft trajectory as a function of both the outputs of the GPS receiver and inertial data.

Figure 8:
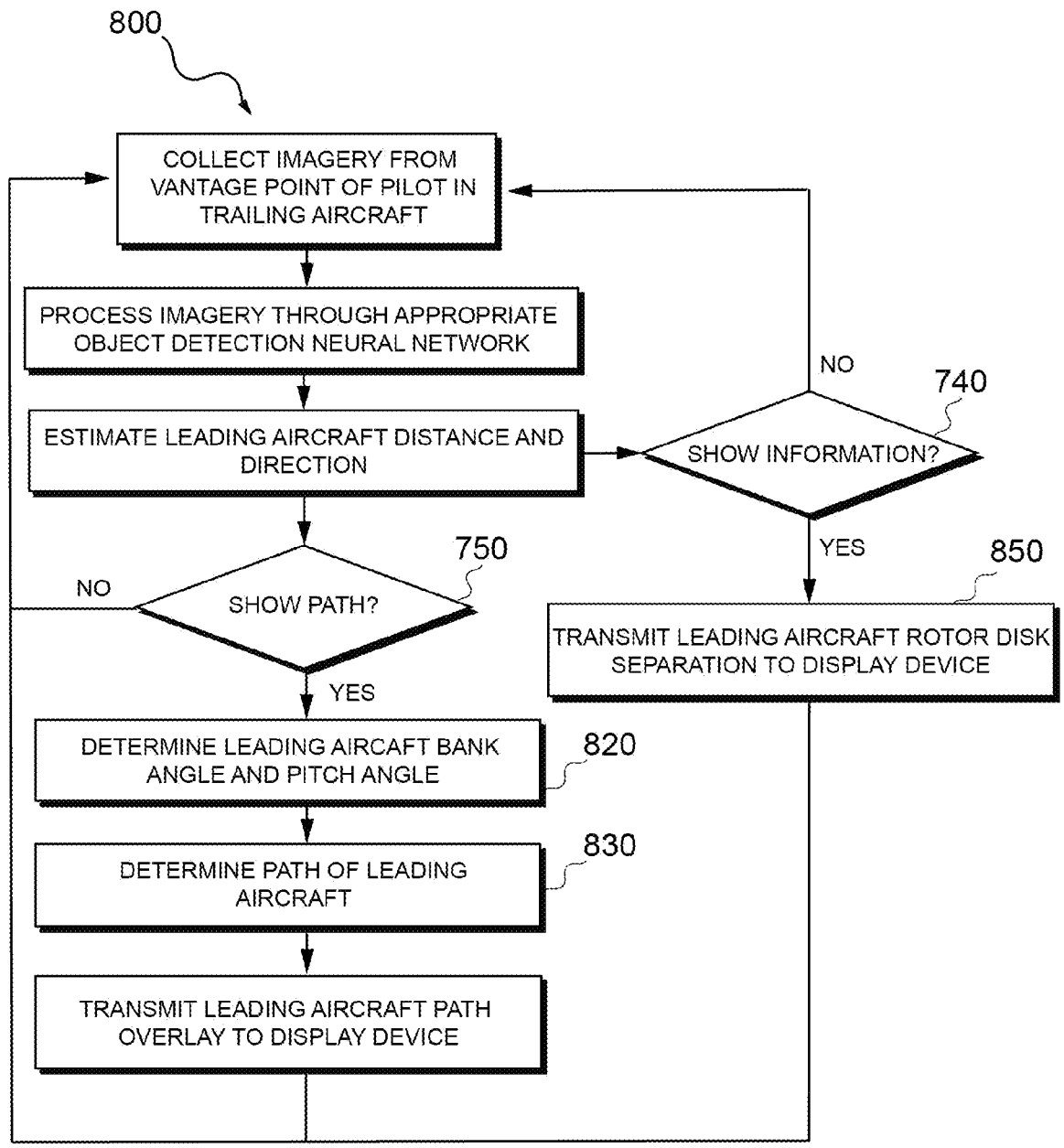
FIG. 8 depicts a flowchart of a computer-implemented algorithm illustrating an example of the decision-making function of a virtual overlay program, in accordance with an embodiment of the present invention.

FIG. 8 depicts a flowchart of a computer-implemented algorithm, generally designated as 800, illustrating an example of the decision-making function of a virtual overlay program, in accordance with an embodiment of the present invention. As in FIG. 6, imagery is collected from the pilot's vantage point using camera 136 and processed through one or more object detection models in real-time, from which the leading aircraft's relative distance and direction is then determined using the hardware and sensors discussed above. Formation flight information and predicted path of the leading aircraft may be displayed on the generated overlay per 740 and 750 respectively depending on user input 120 selections. Users may elect to reduce the amount of information shown on augmented reality display 138 based on the mission type and the planned extent of aircraft spacing. This feature is intended to be accessible and editable in-flight.

To determine the predicted path of the leading aircraft 830, leading aircraft heading (yaw), bank (roll), and pitch angle must be determined 820. This step may be performed, optically, and/or using the various hardware and sensors, as discussed above, and with the use of known orientation-estimation techniques. The predicted path of the leading aircraft is then estimated to a specified future time-step and transmitted to augmented reality display 138 via virtual overlay program 137. For instance, the algorithm 800 can use an exemplary 3 second forecast window. But other times for the forecast window can be used with a caveat. Too far in time, and the trajectory will likely be incorrect with the addition of new pilot control inputs. And too little in time and the response time to critical situations (like a mid-air collision) will be too little to prevent catastrophe.

In some implementations, step 820 may be moved above step 750, as the estimation of leading aircraft orientation can improve leading aircraft tracking that informs the directionality vector in a lost visual contact alert 520, regardless of whether the pilot has decided to display the predicted path of the leading aircraft 830.

Figure 9:
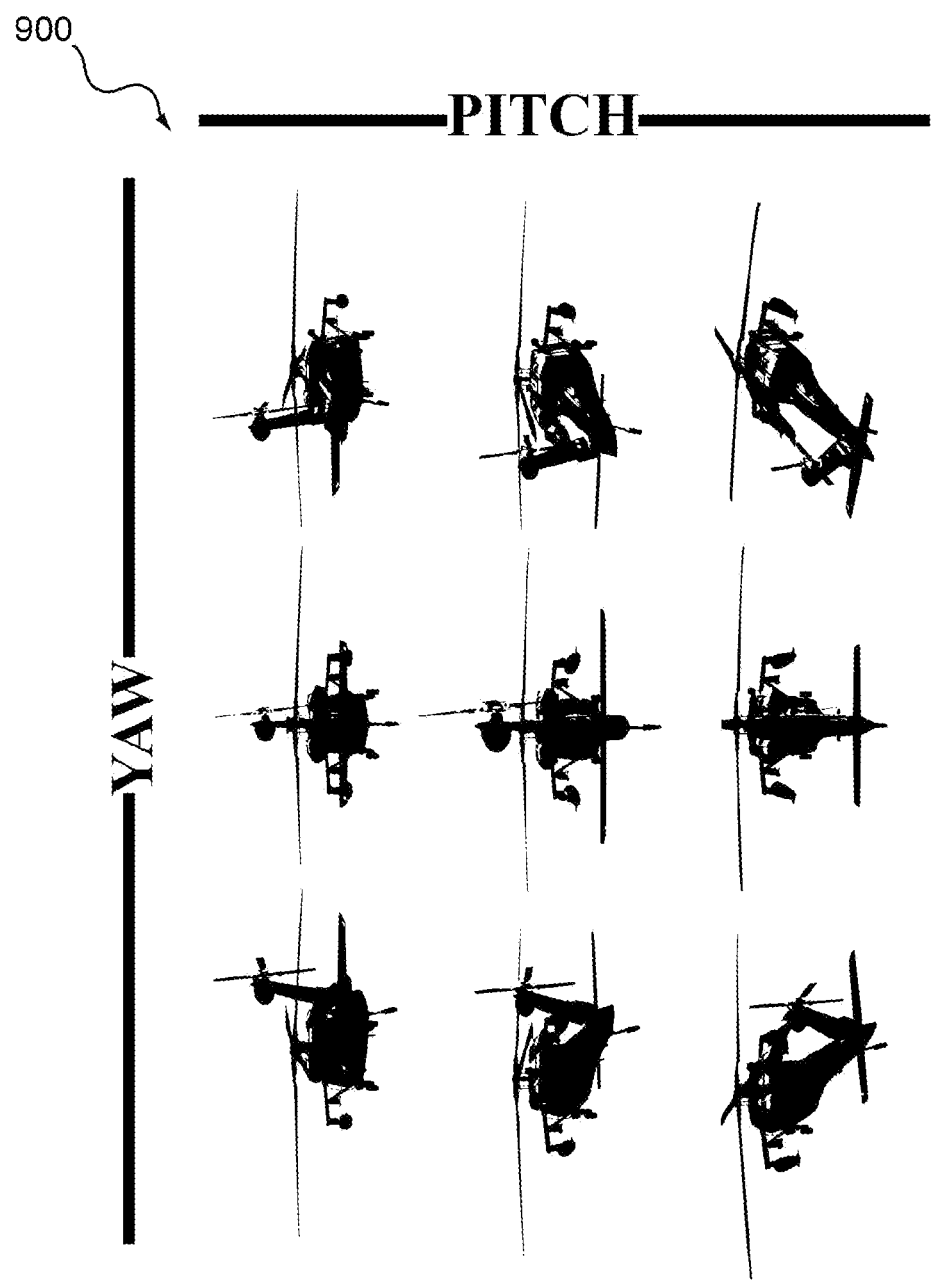
FIG. 9 depicts examples of a leading aircraft, as seen from a trailing aircraft, at differing yaw and pitch orientations.
Figure 10:
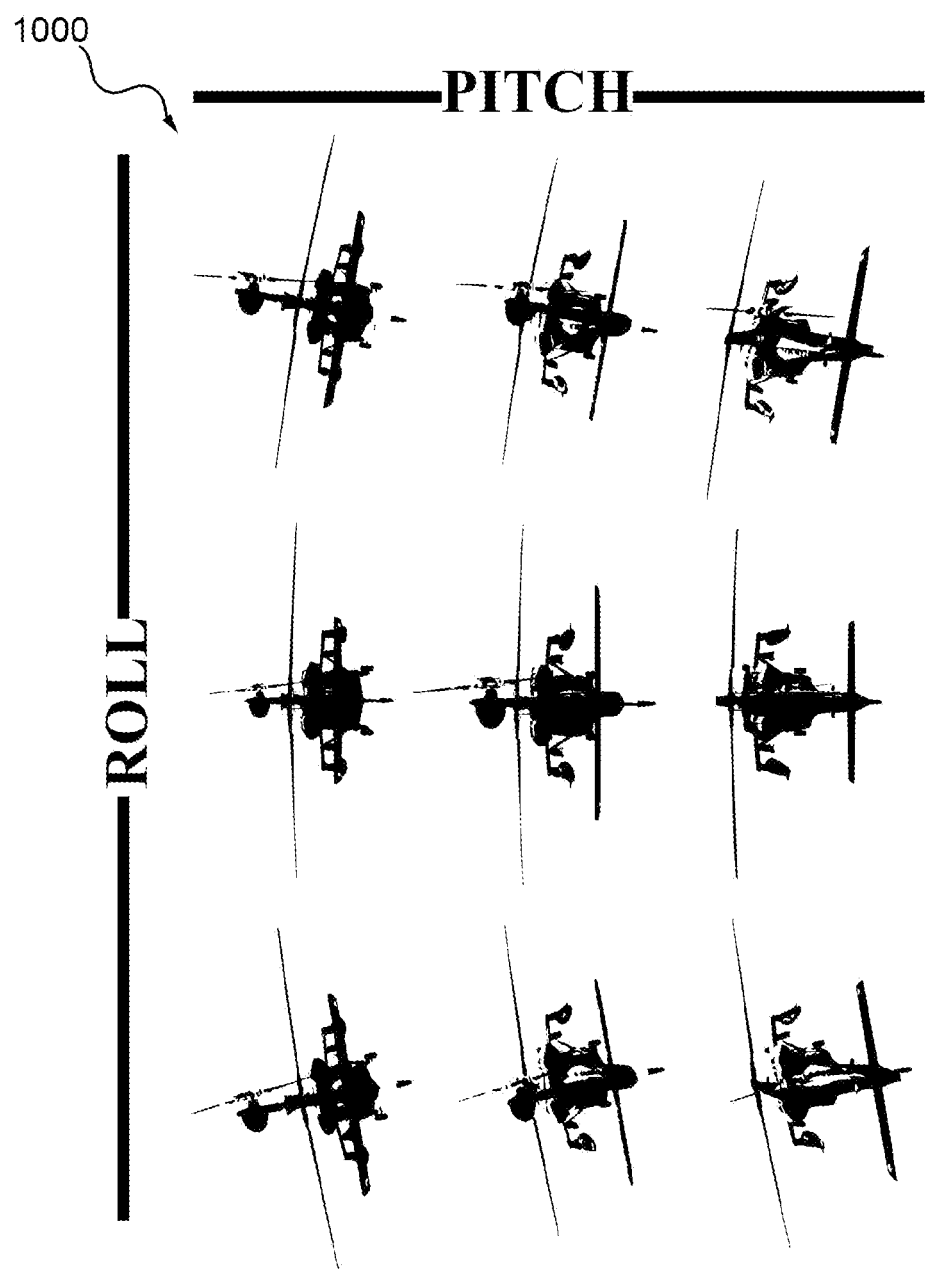
FIG. 10 depicts examples of a leading aircraft, as seen from a trailing aircraft, at differing roll and pitch orientations.
Figure 11:
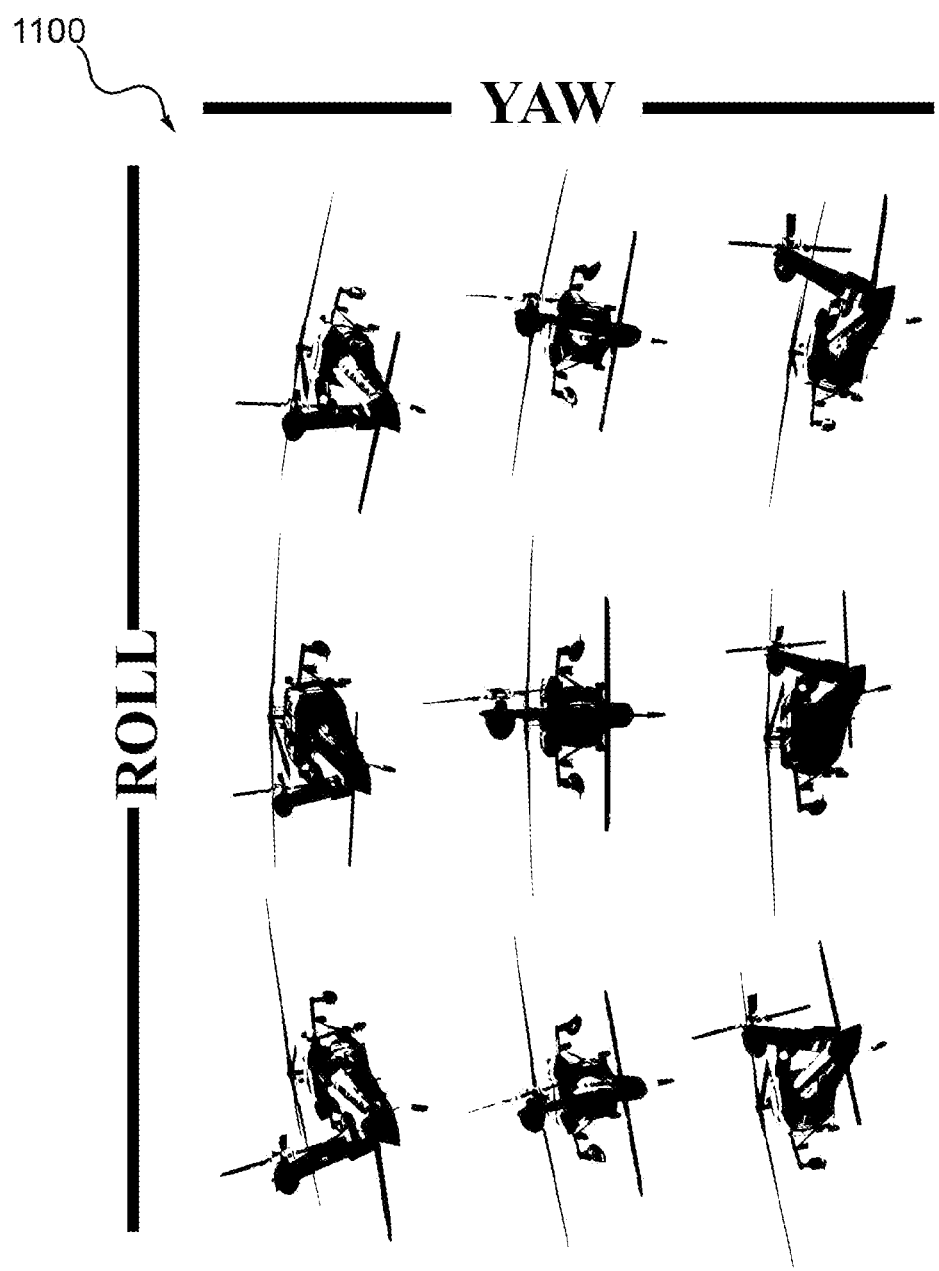
FIG. 11 depicts examples of a leading aircraft, as seen from a trailing aircraft, at differing roll and yaw orientations.

FIG. 9, FIG. 10, and FIG. 11 depict various orientations of a leading aircraft, in this case a UH-60 helicopter, from the perspective of a trailing aircraft. FIG. 9, generally denoted 900, depicts examples of a leading aircraft, as seen from a trailing aircraft, at differing yaw and pitch orientations. FIG. 10, generally denoted 1000, depicts examples of a leading aircraft, as seen from a trailing aircraft, at differing roll and pitch orientations. FIG. 11, generally denoted 1100, depicts examples of a leading aircraft, as seen from a trailing aircraft, at differing roll and yaw orientations.

The relative positioning of unique aircraft features in different orientations allow orientation estimation models to capture aircraft yaw, roll, and pitch angle data. For instance, Euler angles can be determined and used for estimating orientation of an aircraft as a non-limiting example. The orientation of a self-propelled object, such as an aircraft, can inform its direction of motion, and therefore predicted trajectory—valuable information to be displayed on an augmented reality display for formation flight. Machine learning literature suggests multiple differing approaches to the orientation estimation problem, most contingent on the extent of rotation and presence of discontinuities resulting from symmetries in the detected object. For a leading aircraft, three-dimensional Euler angle representation discontinuities such as gimbal lock are largely irrelevant, as most aircraft are, whether due to specified aircraft limitations or policy and regulation, restricted to small changes in yaw, roll, and pitch. For example, a UH-60 is generally limited to 30 degrees in bank, 60 degrees in roll, and a yaw rate of 30 degrees per second. Quaternion and spatial representations may be better suited for aircraft capable of aerobatic flight, and which therefore see extreme orientations. Quaternions often complicate existing learning models due to their antipodal symmetry. Separately, most aircraft feature plane reflection symmetry across the two-dimensional plane defined by lateral and vertical axes, whereas other directions are non-ambiguous. Despite the discussed discontinuities and symmetries, the literature has suggested several symmetry invariant unique representations that are, when paired with the appropriate inference models, capable of generalizing three-dimensional object orientation with a single image.

Figure 12:
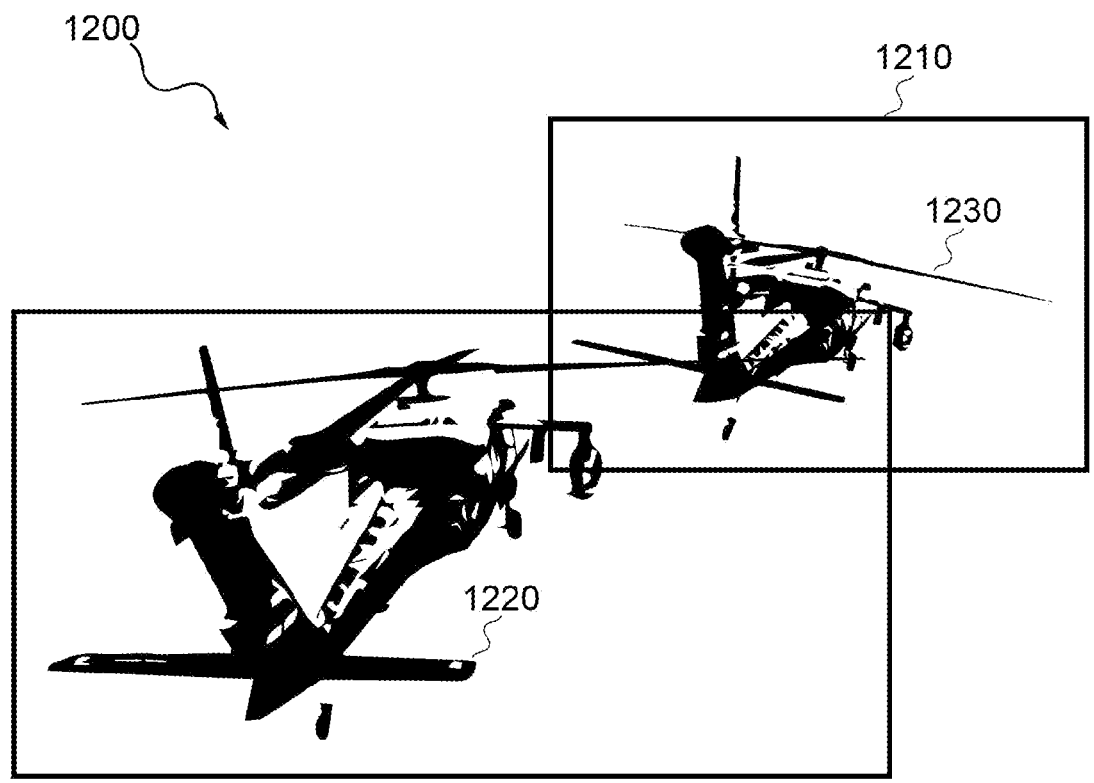
FIG. 12 depicts an example of overlapping aircraft in a staggered left configuration, with bounding boxes shown, in accordance with an embodiment of the present invention.

FIG. 12 depicts an example of overlapping aircraft in a staggered left configuration, with bounding boxes shown, in accordance with an embodiment of the present invention. The presence of multiple leading aircraft tends to result in aircraft overlap, especially in uniformly staggered configurations with tight spacing. The overlap of the same type of object results in what is known as intra-class occlusions, which can prove challenging for object detection and tracking algorithms. Ideally, the bounding box of a partially occluded aircraft must be amodal in nature—that is, it should encompass the entirety of the aircraft, to include the portion occluded by a second aircraft. However, for embodiments of the invention, the leading aircraft of critical importance is the one closest in proximity, which also happens to be the aircraft that is not partially occluded. Still, detector non-maximum suppression (NMS) may require tuning and specialization to ensure that the implicit hypothesis that bounding boxes featuring significant overlap correspond to a single object does not result in poor detection and tracking.

Methods for tracking single and multiple objects are known. For instance, see Cindy Trinh Sridykhan, "A tour of Video Object Tracking—Part II: Single Object Tracking," Medium, 2019, available online at: https:/medium.com/@cindy.trinh.sridykban/a-tour-of-video-object-tracking-708261304ea7, and "A tour of Video Object Tracking—Part III: Multiple Object Tracking," Medium, 2019, available online at: https://medium.com/@cindy.trinh.sridykban/a-tour-of-video-object-tracking-part-iii-multiple-object-tracking-5e3a15ae0a7c, herein incorporated by reference in their entireties. These and others can be readily adapted for aircrafts as objects and tracking one or more of them at a time.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A system for calculating and displaying formation flight information through an augmented reality display device on a trailing aircraft in a flight formation, the system comprising:
 a helmet wearable by a pilot of an aircraft including one or more outward-facing cameras collecting imagery from the vantage point of a pilot in the trailing aircraft;
 one or more augmented reality displays;
 a processor configured to estimate the distance, direction, and orientation of a leading aircraft based on the imagery of one or more outward-facing cameras; and
 a virtual overlay program for displaying information relating to leading aircraft distance, direction, and orientation on the augmented reality display.

2. The system of claim 1, wherein information relating to leading aircraft distance, direction, and orientation is presented as text or symbology, and optionally comprise aircraft spacing, the predicted trajectory of the leading aircraft, and/or lost visual contact alerts.

3. The system of claim 1, wherein the pilot is provided an option to differentiate between being a pilot on the controls and a pilot managing the cockpit, in the case of a two-pilot aircraft for which to display from the vantage point thereof using the virtual overlay program.

4. The system of claim 1, wherein the estimation of leading aircraft distance and direction is accomplished by the processor using object detection and tracking techniques.

5. The system of claim 1, wherein the estimation of the leading aircraft pitch, bank, and roll angles by the processor is performed using orientation estimation and object tracking techniques.

6. The system of claim 1, further comprising one or more pressure sensors; and
wherein the processor is further configured to determine leading and trailing aircraft altitude as a function of the outputs of one or more pressure sensors and leading aircraft distance and direction.

7. The system of claim 1, further comprising one or more global positioning system (GPS) receivers; and wherein the processor is further configured to determine leading and trailing aircraft location as a function of the outputs of one or more GPS receivers and leading aircraft distance and direction.

8. The system of claim 1, further comprising a plurality of gyroscopes and one or more compasses; and wherein the processor is further configured to detect and track the leading aircraft from the vantage point of the pilot in the trailing aircraft, as a function of the outputs of the plurality of gyroscopes, one or more compasses, and leading aircraft distance and direction.

9. A method for determining and displaying formation flight lost visual contact alerts using an augmented reality display device, the method comprising:
collecting imagery from the vantage point of a pilot in a trailing aircraft using one or more outward-facing cameras;
determining the presence of a leading aircraft from the vantage point of the pilot in the trailing aircraft using a processor running an object detection neural network; and
issuing a lost visual contact alert to an augmented reality display if the processor determines that the leading aircraft is not visible from the vantage point of the pilot in the trailing aircraft.

10. The method of claim 9, wherein the relative positioning of the leading aircraft from the vantage point of the pilot in the trailing aircraft is further determined and tracked using mapping supported by a plurality of gyroscopes and/or one or more compasses.

11. The method of claim 9, wherein the relative positioning of the leading aircraft from the vantage point of the pilot in the trailing aircraft is further determined and tracked using object tracking techniques.

12. The method of claim 9, wherein the issued lost visual contact alert displays information is defined by a user input form.

13. The method of claim 9, wherein the issued lost visual contact alert contains a directionality vector denoting the relative position of the leading aircraft outside of the immediate view of the pilot in the trailing aircraft.

14. A method for calculating and displaying formation flight information using an augmented reality display device, the method comprising:
collecting imagery of a leading aircraft from the vantage point of a pilot in a trailing aircraft using one or more outward-facing cameras mounted in or on a helmet wearable by a pilot of an aircraft;
estimating leading aircraft distance and direction using object detection and tracking techniques processing imagery of the leading aircraft from the vantage of point of the pilot in the trailing aircraft using a processor;
estimating aircraft relative position as a function of leading aircraft distance and direction using the processor; and
displaying information relating to aircraft relative position on an augmented reality display device using a virtual overlay program generated by the processor.

15. The method of claim 14, wherein information relating to aircraft relative position is presented as text and/or symbology.

16. The method of claim 14, wherein information relating to aircraft relative position comprises aircraft spacing and/or lost visual contact alerts.

17. The method of claim 14, further comprising: providing an option for a pilot to differentiate between being a pilot on the controls and a pilot managing the cockpit, in the case of a two-pilot aircraft for which to display from the vantage point thereof using the virtual overlay program.

18. The method of claim 14, wherein the object detection and tracking techniques are aircraft specific.

19. A method for calculating and displaying formation flight information using an augmented reality display device, the method comprising:
collecting imagery of a leading aircraft from the vantage point of a pilot in a trailing aircraft using one or more outward-facing cameras mounted in or on a helmet wearable by a pilot of an aircraft; and
estimating, using at least one processor, leading aircraft bank angle, pitch angle, and heading using orientation estimation techniques processing imagery of the leading aircraft from the vantage of point of the pilot in the trailing aircraft; and
estimating, using the at least one processor, a predicted trajectory of the leading aircraft as a function of leading aircraft bank angle, pitch angle, and heading; and
displaying the predicted trajectory of the leading aircraft on an augmented reality display device using a virtual overlay program generated by the at least one processor.

20. The method of claim 19, wherein the leading aircraft and/or predicted trajectory thereof is presented as text or symbology.

21. The method of claim 19, further comprising: providing an option for a pilot to differentiate between being a pilot on the controls and a pilot managing the cockpit, in the case of a two-pilot aircraft for which to display from the vantage point thereof using the virtual overlay program.

22. The method of claim 19, wherein the orientation estimation techniques are aircraft specific, and wherein the method further comprises: providing a digital user input form to a pilot to select the aircraft type.

* * * * *